United States Patent
Rashid et al.

(10) Patent No.: US 10,827,035 B2
(45) Date of Patent: Nov. 3, 2020

(54) DATA UNIQUED BY CANONICAL URL FOR REST APPLICATION

(71) Applicant: Oracle International Corporation, Redwood Shores, CA (US)

(72) Inventors: Mohammad Aminur Rashid, Bangalore (IN); Sekhar Korupolu, Dublin, CA (US); Shailesh Vinayaka, Los Gatos, CA (US); Fabio Saraiva de Souza, Belmont, CA (US); Shimpa Saxena, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 662 days.

(21) Appl. No.: 14/017,575

(22) Filed: Sep. 4, 2013

(65) Prior Publication Data
US 2015/0067029 A1     Mar. 5, 2015

(51) Int. Cl.
*H04L 29/06*     (2006.01)
*H04L 29/08*     (2006.01)

(52) U.S. Cl.
CPC .............. *H04L 67/42* (2013.01); *H04L 67/02* (2013.01)

(58) Field of Classification Search
CPC .......... H04B 10/00; H04N 5/00; H04L 67/42; H04L 67/02
See application file for complete search history.

(56) References Cited

U.S. PATENT DOCUMENTS

| | | | | |
|---|---|---|---|---|
| 7,222,139 B2* | 5/2007 | Mau | ...................... | G06Q 30/06 707/622 |
| 9,407,727 B1* | 8/2016 | McCanne | ............... | H04L 67/42 |
| 2002/0062241 A1* | 5/2002 | Rubio | ............... | G06Q 30/0202 705/7.31 |
| 2005/0144518 A1* | 6/2005 | Ricart | ................ | G06F 11/1464 714/13 |
| 2010/0070561 A1* | 3/2010 | Dhoolia | .................. | G06F 15/16 709/203 |
| 2010/0330976 A1* | 12/2010 | Berna Fornies | ...... | H04L 67/125 455/419 |
| 2012/0102221 A1* | 4/2012 | Grieve | ............... | G06F 16/9566 709/238 |

(Continued)

*Primary Examiner* — Tonia L Dollinger
*Assistant Examiner* — Jihad K Boustany
(74) *Attorney, Agent, or Firm* — Kilpatrick Townsend & Stockton LLP

(57) ABSTRACT

Pieces of an entity's data set can be related with each other using a canonical Uniform Resource Locator (URL). If a server returns pieces of an entity's data record to a client within multiple separate REST-based responses, the client can discern from the canonical URL that those pieces relate to the same entity. In response to each REST-based request from a client, a server returns, with the client-requested data, a canonical URL that uniquely identifies that data's entity. A client can receive the canonical URL with the data that the server returns. If the canonical URLs returned along with data items in separate requests match, then the client determines that those data items pertain to the same entity. If the client determines that separately received data items pertain to the same entity, then the client can merge those data items together into a unified record that the client stores locally.

20 Claims, 5 Drawing Sheets

(56) References Cited

U.S. PATENT DOCUMENTS

| | | | | |
|---|---|---|---|---|
| 2012/0131683 A1* | 5/2012 | Nassar | ............ | G06F 17/301 726/28 |
| 2013/0159387 A1* | 6/2013 | James | ............ | G06F 17/277 709/203 |
| 2018/0052807 A1* | 2/2018 | Jiang | ............ | G06F 16/951 |

* cited by examiner

DATA UNIQUED BY CANONICAL URL FOR REST APPLICATION

BACKGROUND

If one desired to access an employee record over the Internet, one might open a web page in order to log in to a human resources system. Such a system might include various navigational links that could be used to search for the desired employee record. One might then access an employee-specific webpage that presented information specific to the selected employee. Alternatively, the employee record could be obtained using web services. More specifically, an "employee service" could be established in order to serve such information to those who sought it. This employee service could be established based on a description of the type and structure of the employee service. The service could provide employee information pertaining to the employee himself, the employee's dependents, the employee's payroll information. The employee's "type" can be fully described. A client application seeking to obtain a particular employee's information could use this type in order to obtain all of that particular employee's information from a server in a single round-trip.

Representational State Transfer (REST) is a style of software architecture for distributed systems such as the World Wide Web. REST can be implemented as a pattern to access a set of business rules. REST is a specification of a web service mechanism in which complete path information is not described. REST does not involve any hidden discovery of type information. In REST, there is no single function that returns the whole hierarchy of an information graph that is sought. Instead, in REST, information can be obtained piece-by-piece. Each item of information can include links to further items of information. Additionally or alternatively, a document can contain a pattern that explains how to obtain further information as that information is needed. Communicating data in this manner eliminates the burden of describing a type. The amount of information transmitted in the payload communicated can be reduced. For example, in REST, a first request could ask for an employee's personal information. A second request could ask for that employee's dependent's information. A third request could ask for that employee's address. Thus, a transaction can be built around specific items of information that are needed. The payloads communicated and the round-trips required to communicate this information are likely to be optimal.

The use of REST is particularly popular on mobile devices. As is mentioned above, REST does not require any type description. This makes REST very flexible. Using REST, information can be accessed through any kind of client, such as a web client or a mobile client. Using REST, information can be transferred via the HyperText Transfer Protocol (HTTP) over the World Wide Web.

REST-based requests for data sometimes can cause a server to return related data items in separate responses to separate REST-based requests. Potentially, pieces of the same data set—such as data items contained within the same row of a table in a relational database—can be dispersed over multiple responses to multiple REST-based requests. REST has no standard mechanism for indicating that such separately returned pieces of data actually do belong to the same data set.

DETAILED DESCRIPTION

Figure 1:
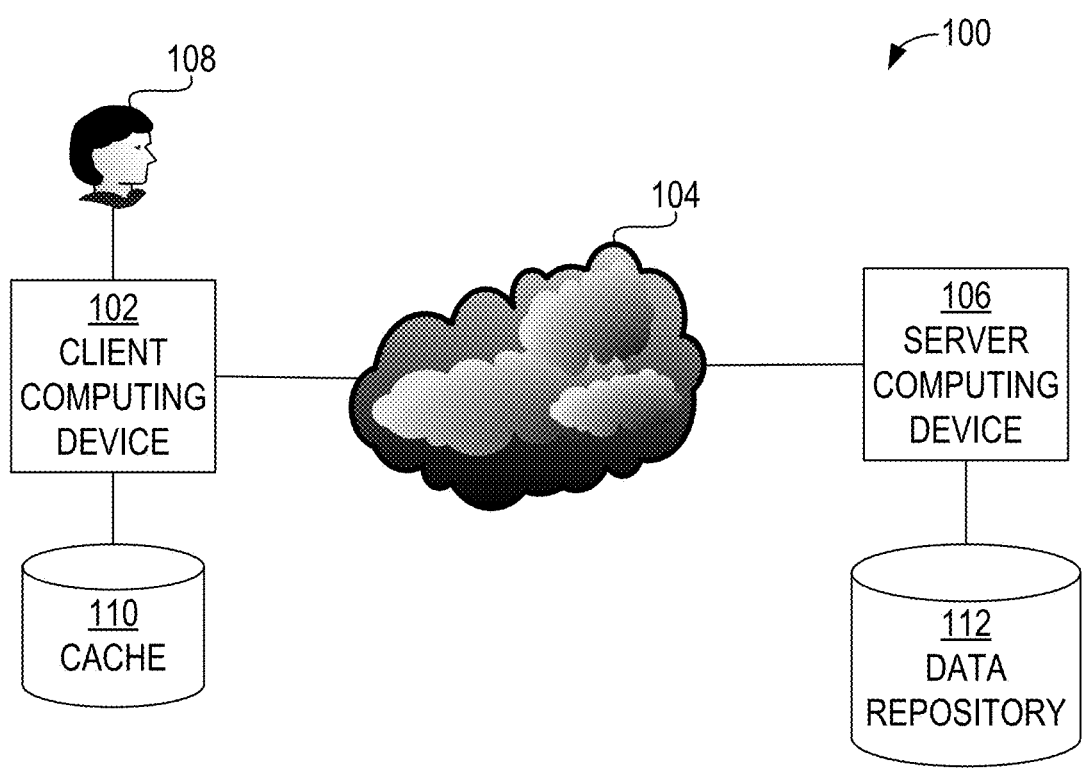
FIG. 1 is a block diagram that illustrates an example of a system in which a client and a server can communicate using REST-based requests and responses, and in which canonical URLs can be used to identify distinct entities, according to an embodiment of the invention.

In the following description, for the purposes of explanation, specific details are set forth in order to provide a thorough understanding of embodiments of the invention. However, it will be apparent that the invention may be practiced without these specific details.

Techniques described herein can relate pieces of the same data set with each other using a canonical Uniform Resource Locator (URL). The canonical URL is canonical because, for a given entity (or object) to which the data set relates, the URL will be the same for that entity (or object) regardless of whether that entity's data set is stored at a client or at a server. Each distinct entity can be associated with a unique canonical URL. Consequently, even if a server returns pieces of a particular entity's data record to a client within multiple separate REST-based responses, the client can discern from the canonical URL that those pieces relate to the same particular entity's data record. A server can store, with each row of data stored in a table of a relational database, a row key that uniquely identifies that row. In an embodiment of the invention, in response to each REST-based request from a client, such a server returns, with the requested data contained in a particular row, a canonical URL that uniquely identifies that particular row.

A client can receive the canonical URL with the data that the server returns. If the canonical URLs returned along with data items in separate requests are the same, then the client can responsively determine that those data items are from the same row. If the client determines in this manner that separately received data items are from the same row, then the client can responsively merge those data items together into a unified record that the client stores locally.

A particular REST-based response from a server can contain a single canonical URL. Alternatively, a particular REST-based response can contain multiple different canonical URLs if data items from multiple different rows are contained within that response. For example, a response can contain a first canonical URL that is associated with an employee, a second canonical URL that is associated with a location, and a third canonical URL that is associated with an address. If a client receives a subsequent REST-based reply for an employee that is at the same address as an employee whose data was received in a previous reply, then the client can determine, from the canonical URL that is uniquely associated with the address in both replies, that the addresses are the same. In response to making such a determination, the client can determine whether the second reply contains additional information that the first reply omitted. If so, then the client can merge that additional information into the client-stored record that contains the information from the first reply. As a result, the client can locally maintain a single copy of each distinct data item, even if pieces of that data item arrived at the client in separate REST-based responses. For example, if multiple data items from multiple separate responses are all associated with the same canonical URL, then the client can place information from each of those data items into the same row of a table in a relational database stored at the client.

In an embodiment of the invention, the client can maintain a locally stored cache of data. Data items pertaining to the same canonical URL can be merged together in a cache record associated with that canonical URL. Before the client makes a request to the server for information associated with a particular canonical URL, the client can check to see whether any of that information is already stored in the cache record associated with the particular canonical URL. If so, then the client can avoid requesting at least that part of the information from the server in a new REST request. The client can fulfill a client-side desire to view that information at least partially using data that is stored in the cache record. The cache can be a relational database in which canonical URLs are stored and used as row keys.

In certain embodiments of the invention, a relational database maintained by the server can store values of attributes pertaining to a distinct entity (e.g., an employee) in a manner that disperses those values among rows of separate relational tables. In such embodiments, the database-generated row identifiers for the rows storing a particular entity's attribute values can vary from table to table. However, each such row storing some of the particular entity's attribute values can also contain the same canonical URL that is uniquely associated with the particular entity. Thus, even if the database-generated row identifiers are not usable to determine that the data stored in rows of separate tables pertain to the same entity, the canonical URLs contained within those rows can be usable to do so. REST transmits data in the form of URLs, and the canonical URLs are already in that form.

In an embodiment of the invention, the server to which clients send REST-based requests automatically generates the canonical URL for each entity whose data the server maintains. The server can transmit, to a client, the canonical URL along with the data which is associated with that canonical URL in response to that client's REST-based request for that data. Under circumstances in which the REST-based request only requests certain specified attribute values (e.g., first and last name only) of an entity rather than all of the entity's attribute values, the server can still return, with the specified attribute values, the canonical URL that is associated with the entity in the server's data store.

In an embodiment, the server generates the canonical URL based on values of a specified key subset of each entity's attributes that are known to uniquely identify those entities (e.g., social security number); the canonical URL for a particular entity can contain the values of the specified key subset of that particular entity's attributes. In one embodiment of the invention, a client can specify, to a server, for a particular type of entity, which of the attributes of entities of that type are supposed to serve as the specified key subset of attributes for entities of that type, and the server can follow this specification when generating canonical URLs for entities of that type.

Because a client can associate, in its cache, all of the received attribute values for a particular entity with the same canonical URL, the client can subsequently use the information in that cache to satisfy requests for a mere subset of the particular entity's attribute values without making another request to the server. For example, if a first (or several) requests to the server collectively caused all (or nearly all) of the attribute values for a particular employee to be stored in association with that particular employee's canonical URL in the client's cache, then a later desire at the client to view just the first and last name of the employee associated with that canonical URL might be fulfilled simply by retrieving those selected attribute values from the canonical URL-associated record in the client's cache rather than through another request to the server.

Each server REST-based response can include attribute values for separate entities associated with separate canonical URLs. In an embodiment, when a client receives a response containing multiple attribute values associated with separate canonical URLs, the client can determine, from the canonical URL associated with each attribute value, the entity to which that attribute value pertains. For each such attribute value, the client can then add or update that attribute value within the cache record that is associated with that attribute value's associated canonical URL. In the client's cache, the attribute values for a particular entity's record can be constructed gradually over the course of the client's receipt of multiple separate and potentially unrelated REST-based responses from the server. For example, one response might indicate first names and associated canonical URLs for several different employees, while another response might indicate last names and associated canonical URLs for those employees. Each response can enable the client to augment the information stored in the employee records in its cache.

For a more specific example, a client might first issue, to a server, a first REST-based request for first and last names of the ten top-performing employees of a company. In response to the first REST-based request, the server might return, to the client, a first REST-based response (e.g., a document) that indicates the first and last names (but not the addresses) of the ten top-performing employees of the company, along with the canonical URLs associated with each such employee. The client may then store, in its local cache, a separate record for each employee associated with the canonical URL for that employee, and may store the first and last name of each employee in that employee's record. Subsequently, the client might issue, to the server, a second REST-based request for all addresses of all employees who live in California. In response to the second REST-based request, the server might return, to the client, a second REST-based response (e.g., a document) that indicates the addresses (but not the first or last names) of all employees that live in California, along with the canonical URLs associated with each such employee. Excepting for the scenario discussed further below, the client may then store, in its local cache, a separate record for each employee associated with the canonical URL for that employee, and may store the address of each employee in that employee's record.

However, it is possible, in the foregoing scenario, that one or more of the ten top-performing employees of the company might also live in California. Under such circumstances, rather than creating new records for such employees in its cache in response to receiving the second REST-based response, the client can match the canonical URLs from the first and second REST-based responses in order to determine that records for such employees already exist in the cache. For each record that already contains a first and last name for an employee associated with a particular canonical URL, the client can add the address associated with that particular canonical URL to that record instead of creating a new and separate record in the cache. Regardless of which part of a entity's attribute values are projected within a server's REST-based reply, the client can use the entity's canonical URL in order to identify which record in the cache should be updated with those attribute values.

FIG. 1 is a block diagram that illustrates an example of a system 100 in which a client and a server can communicate using REST-based requests and responses, and in which canonical URLs can be used to identify distinct entities, according to an embodiment of the invention. System 100 can include a client computing device 102, a network 104 (e.g., the Internet), and a server computing device 106. Client computing device 102 can be, for example, a desktop computer, a laptop computer, a mobile telephone, or any other kind of computing hardware, typically possessing one or more central processing units. A user 108 can interact with client computing device 102 using a graphical user interface that client computing device 102 displays to user 108. Client computing device 102 can send REST-based requests to server computing device 106 over network 104. Server computing device 106 can respond to such REST-based requests with REST-based responses that server computing device 106 sends over network 104 to client computing device 102. Both the requests and the responses can contain one or multiple canonical URLs that are uniquely associated with the entities to whose data the requests and responses pertain and/or contain.

Client computing device 102 can contain or can be connected to a cache 110 in which client computing device 102 can store data received in responses from server computing device 106. In cache 110, each entity's data can be associated with the canonical URL for that entity. In an embodiment of the invention, no more than one record is maintained for each canonical URL, so that no entity's data is duplicated within cache 110. Server computing device 106 can contain or can be connected to a data repository 112 from which server computing device 106 can read data to place within responses to client computing device 102. In data repository 112, each entity's data can be associated with the canonical URL for that entity. One or both of cache 110 and data repository 112 can be relational databases. A particular entity's data can be located within a single canonical URL-associated row of a table, or dispersed among single rows (all associated with the same canonical URL) of several separate tables. Requests from client computing device 102 can specify specific attributes of a canonical URL-identified entity. Responses from server computing device 106 can contain values of such attributes (potentially omitting values for non-requested attributes) and the canonical URLs associated with the entities to which those attributes belong.

Figure 2:
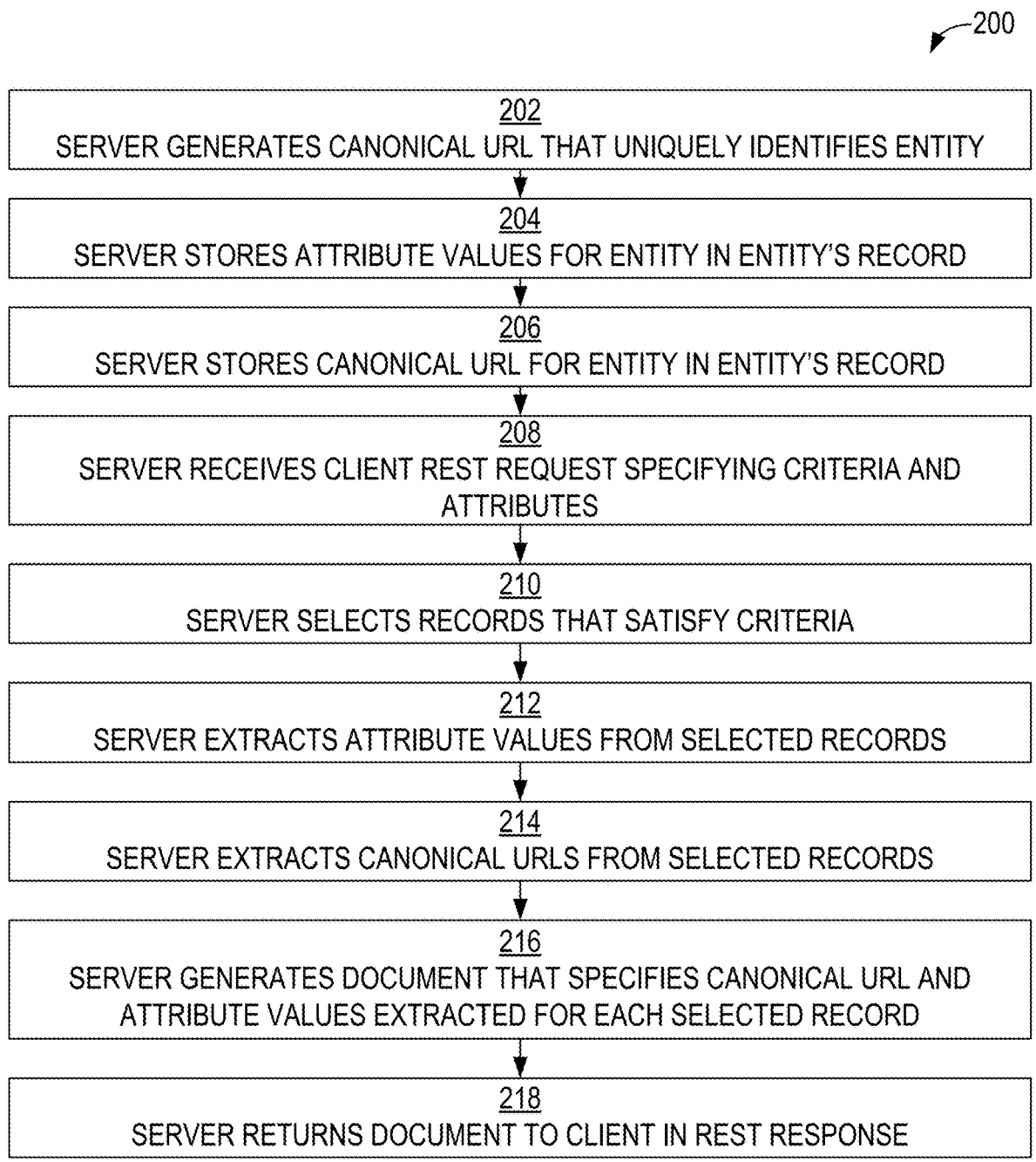
FIG. 2 is a flow diagram that illustrates an example of a technique in which a server can generate canonical URLs for entities, store those canonical URLs within records for those entities, and respond to REST-based requests with REST-based responses that identify entities using those canonical URLs, according to an embodiment of the invention.

FIG. 2 is a flow diagram that illustrates an example of a technique 200 in which a server can generate canonical URLs for entities, store those canonical URLs within records for those entities, and respond to REST-based requests with REST-based responses that identify entities using those canonical URLs, according to an embodiment of the invention. Alternative embodiments of the invention can involve additional, fewer, or different operations than those specifically shown in FIG. 2. Furthermore, alternative embodiments of the invention can involve such operations being performed in an order different from that specifically shown in FIG. 2. In block 202, a server can generate a canonical URL that uniquely identifies an entity (or object). In block 204, the server can store attribute values of the entity in a record for that entity. In block 206, the server can store the canonical URL for the entity in the record for that entity.

In block 208, the server can receive, from a client, a REST-based request that specifies criteria and a subset of record attributes. In block 210, the server can select, from its storage, one or more records having attribute values that satisfy the request-specified criteria. In block 212, the server can extract, from the selected records, the attribute values of the attributes in the request-specified subset of attributes. In block 214, the server can extract, from the selected records, the canonical URLs contained in those records. In block 216, the server can generate a document that specifies, for each selected record, both the canonical URL extracted from that record and the attribute values extracted from that record. In block 218, the server can return the document to the client in a REST-based response. Potentially, a REST-based response can contain more than one such document generated in response to more than one REST-based request.

Figure 3:
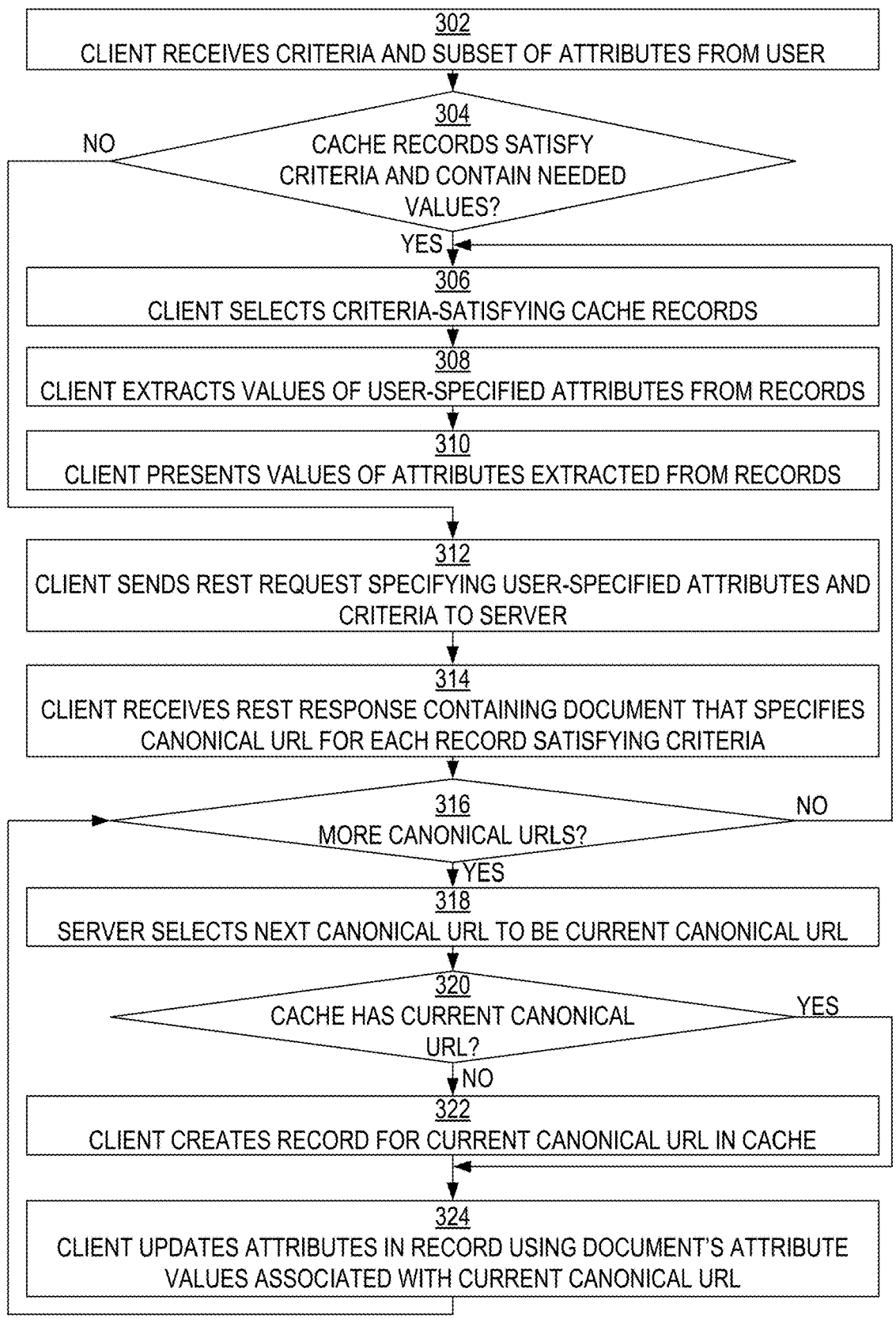
FIG. 3 is a flow diagram that illustrates an example of a technique in which a client can issue REST-based requests for entity attribute values for criteria-satisfying records having attribute values that are not already contained in the client's cache, receive REST-based responses that identify canonical URLs for entities to which the attribute values pertain, and update cache records based on the attribute values and the canonical URLs, according to an embodiment of the invention.

FIG. 3 is a flow diagram that illustrates an example of a technique 300 in which a client can issue REST-based requests for entity attribute values for criteria-satisfying records having attribute values that are not already contained in the client's cache, receive REST-based responses that identify canonical URLs for entities to which the attribute values pertain, and update cache records based on the attribute values and the canonical URLs, according to an embodiment of the invention. Alternative embodiments of the invention can involve additional, fewer, or different operations than those specifically shown in FIG. 3. Furthermore, alternative embodiments of the invention can involve such operations being performed in an order different from that specifically shown in FIG. 3. In block 302, the client can receive criteria and a subset of record attributes from a user. The subset of record attributes are those attributes from criteria-satisfying records in which the user is interested. The subset may include fewer than all of each criteria-satisfying record's attributes. The subset may involve attributes not involved in the criteria and vice-versa. In block 304, the client can determine whether records in the client's cache satisfy the criteria and contain values for the attributes in the subset of record attributes. If records in the client's cache satisfy the criteria and contain values for the attributes in the subset of record attributes, then control passes to block 306. Otherwise, control passes to block 312.

In block 306, the client can select, from its cache, one or more records having attribute values that satisfy the user-specified criteria. In block 308, the client can extract, from the selected records, the attribute values of the attributes in the user-specified subset of attributes. In block 310, for each selected record, the client can present, to the user, the attribute values extracted from that record. Technique 300 then terminates.

Alternatively, in block 312, the client can send, to a server, a REST-based request that contains the user-specified criteria and the user-specified subset of record attributes. In block 314, the client can receive, from the server, a REST-based response that contains a document that specifies, for one or more records that satisfy the criteria, both a canonical URL contained in that record and the values of a subset of attributes from that record. Potentially, the REST-based response can contain multiple such documents containing information related to multiple separate REST-based requests. Under such circumstances, the following operations can be performed separately for each such document.

In block 316, the client can determine whether the document contains any further canonical URLs that the client has not yet handled. If the document does not contain any such further canonical URLs, then control passes back to block 306. Alternatively, in block 318, the client can select the next canonical URL in the document to be the current canonical URL. In block 320, the client can determine whether its cache already contains a record having the current canonical URL. If the cache already contains a record having the current canonical URL, then control passes to block 324. Otherwise, control passes to block 322.

In block 322, the client creates, in the cache, a new cache record having the current canonical URL. Control proceeds to block 324.

In block 324, the client updates attributes in the cache record having the current canonical URL with the values of those attributes associated with the current canonical URL in the document. Existing attribute values contained in the cache record but not in the document can be left unchanged. Control passes back to block 316.

Figure 4:
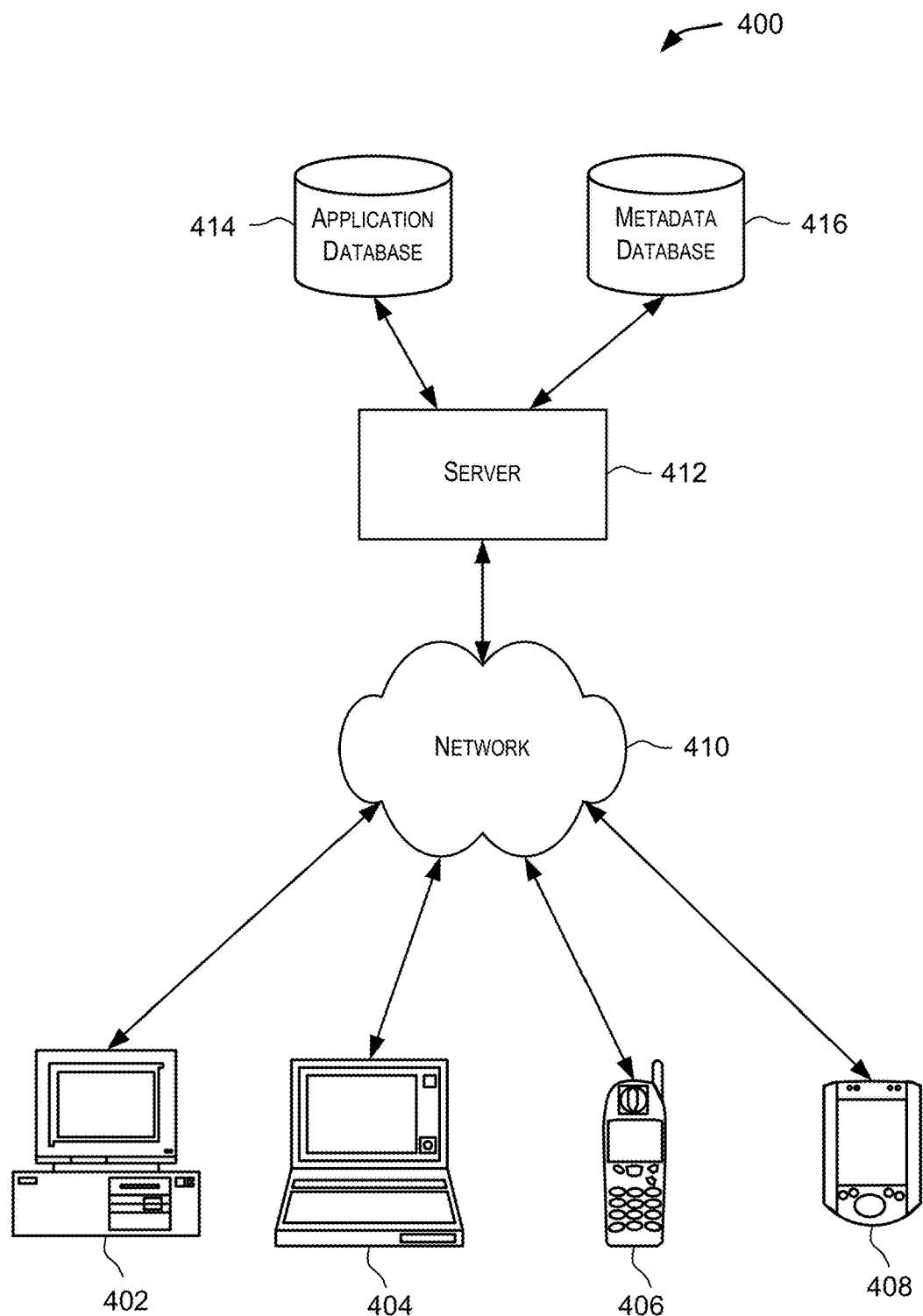
FIG. 4 is a simplified block diagram illustrating components of a system environment that may be used in accordance with an embodiment of the present invention.

FIG. 4 is a simplified block diagram illustrating components of a system environment 100 that may be used in accordance with an embodiment of the present invention. As shown, system environment 400 includes one or more client computing devices 402, 404, 406, 408, which are configured to operate client applications including native client applications and possibly other applications such as a web browser, or the like. In various embodiments, client computing devices 402, 404, 406, and 408 may interact with a server 412.

Client computing devices 402, 404, 406, 408 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 402, 404, 406, and 408 may be any other electronic device, such as a thin-client computer, Internet-enabled gaming system, and/or personal messaging device, capable of communicating over a network (e.g., network 410 described below). Although exemplary system environment 400 is shown with four client computing devices, any number of client computing devices may be supported. Other devices such as devices with sensors, etc. may interact with server 412.

System environment 400 may include a network 410. Network 410 may be any type of network familiar to those skilled in the art that can support data communications using any of a variety of commercially-available protocols, including without limitation TCP/IP, SNA, IPX, AppleTalk, and the like. Merely by way of example, network 410 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 400 also includes one or more server computers 412 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 412 may be adapted to run one or more services or software applications.

Server 412 may run an operating system including any of those discussed above, as well as any commercially available server operating system. Server 412 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 400 may also include one or more databases 414, 416. Databases 414, 416 may reside in a variety of locations. By way of example, one or more of databases 414, 416 may reside on a non-transitory storage medium local to (and/or resident in) server 412. Alternatively, databases 414, 416 may be remote from server 412, and in communication with server 412 via a network-based or dedicated connection. In one set of embodiments, databases 414, 416 may reside in a storage-area network (SAN) familiar to those skilled in the art. Similarly, any necessary files for performing the functions attributed to server 412 may be stored locally on server 412 and/or remotely, as appropriate. In one set of embodiments, databases 414, 416 may include relational databases, such as databases that are provided by Oracle and that are adapted to store, update, and retrieve data in response to SQL-formatted commands.

Figure 5:
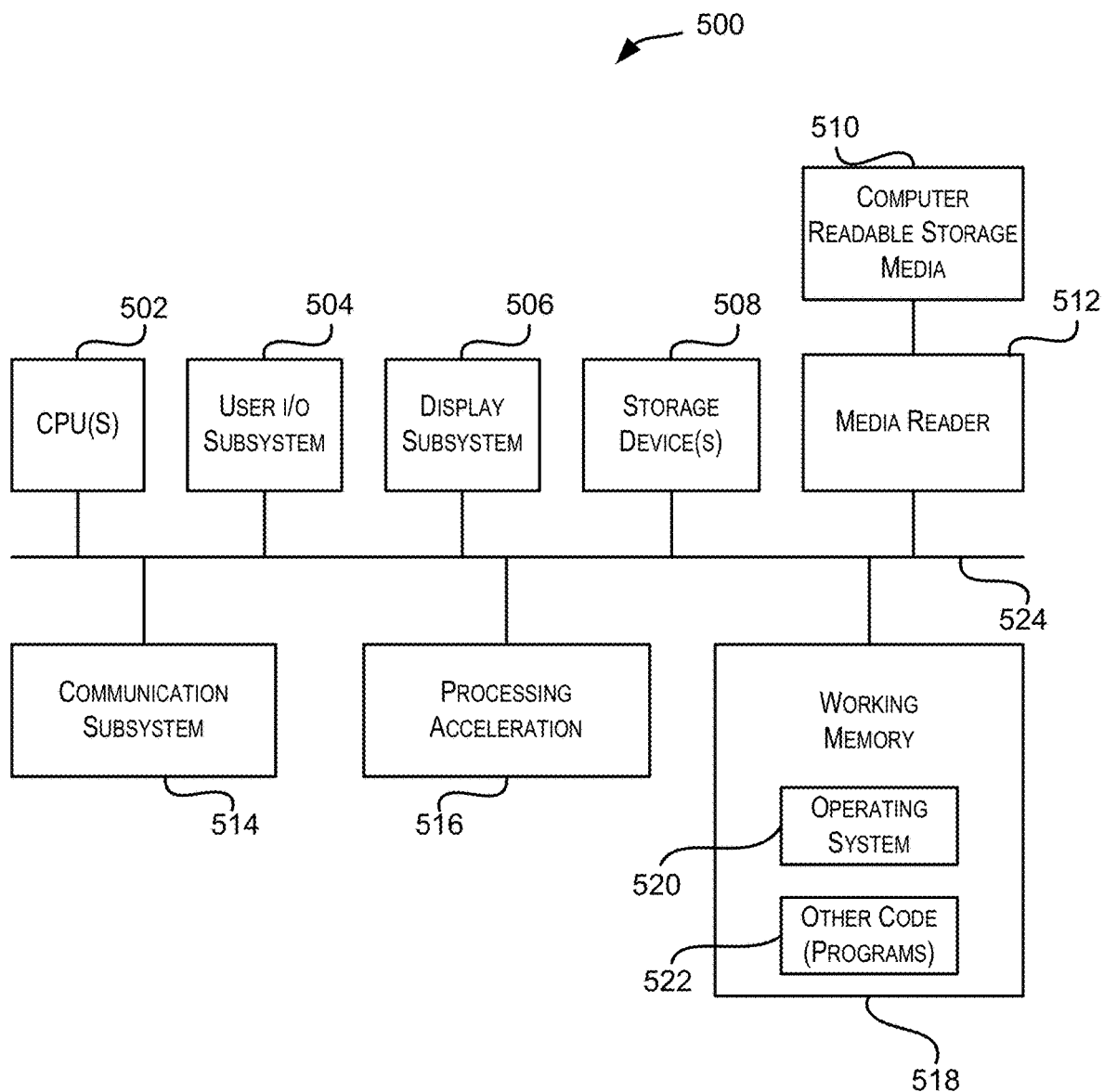
FIG. 5 is a simplified block diagram of a computer system that may be used in accordance with embodiments of the present invention.

FIG. 5 is a simplified block diagram of a computer system 500 that may be used in accordance with embodiments of the present invention. For example server 412 or clients 402, 404, 406, or 408 may be implemented using a system such as system 500. Computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). Computer system 500 may also include one or more storage devices 508. By way of example, the storage device (s) 508 may include devices such as disk drives, optical storage devices, and solid-state storage devices such as a random access memory (RAM) and/or a read-only memory (ROM), which can be programmable, flash-updateable and/or or the like.

Computer system 500 may additionally include a computer-readable storage media reader 512, a communications subsystem 514 (e.g., a modem, a network card (wireless or wired), an infra-red communication device, etc.), and working memory 518, which may include RAM and ROM devices as described above. In some embodiments, computer system 500 may also include a processing acceleration unit 516, which can include a digital signal processor (DSP), a special-purpose processor, and/or the like.

Computer-readable storage media reader 512 can further be connected to a computer-readable storage medium 510, together (and, optionally, in combination with storage device (s) 508) comprehensively representing remote, local, fixed, and/or removable storage devices plus storage media for temporarily and/or more permanently containing computer-readable information. Communications system 514 may permit data to be exchanged with network 410 and/or any other computer described above with respect to system environment 400.

Computer system 500 may also comprise software elements, shown as being currently located within working memory 518, including an operating system 520 and/or other code 522, such as an application program (which may be a client application, Web browser, mid-tier application, RDBMS, etc.). In an exemplary embodiment, working memory 518 may include executable code and associated data structures used for communicating canonical URLs within REST-based communications as described above. It should be appreciated that alternative embodiments of computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method comprising:
   storing, at a server computing device, in association with first data that pertains to a first entity that is an entity object, a first canonical Uniform Resource Locator (URL) that is uniquely associated with the first entity, and wherein the first canonical URL is the same for data of the first entity stored at the server computing device and a client computing device,
   wherein the first canonical URL is configured as a row key that uniquely identifies a row of data stored as a first cache record in a cache of the client computing device and wherein the row of data corresponds to the first entity,
   wherein both the server computing device and the client computing device are configured to manage data for the first entity using the first canonical URL;
   receiving, at the server computing device, from the client computing device, a first Representational State Transfer (REST)-based request querying for a first subset of attributes associated with the first entity of the first data;
   in response to the first REST-based request, extracting, by the server computing device, the first canonical URL and the first subset of attributes associated with the first entity of the first data from a record stored in the server computing device;
   sending, to the client computing device, a response that contains both the first canonical URL and the first subset of attributes associated with the first entity-of the first data for which is requested in the first REST-based request, wherein the client computing device stores the first canonical URL and the first subset of attributes associated with the first entity in the cache of the client computing device;
   receiving, from the client computing device, updated data corresponding to the first canonical URL, wherein the updated data is sent to the server computing device from the client computing device after the client computing device determines that the first canonical URL received in response to the first REST-based request exists in the cache of the client computing device;
   updating, by the server computing device, data corresponding to the first canonical URL that is stored in a data repository associated with the server computing device based on the updated data received from the client computing device;
   receiving, at the server computing device, from the client computing device, a second REST-based request querying for a second subset of attributes associated with the first entity of the first data;
   sending, to the client computing device, a second response that contains at least (a) a second association between a second canonical URL and values of a second subset of attributes of second data that pertains to a second entity that differs from the first entity and (b) a third association between the first canonical URL and values of a third subset of attributes of the first data that pertains to the first entity, said third subset differing from said first subset,
   wherein the client computing device stores in a second cache record that is associated with the second canonical URL and not any other canonical URL, the values of the second subset of attributes,
   wherein the client computing device stores in the cache at the client computing device, in the first cache record that is associated with the first canonical URL and not any other canonical URL, the values of the third subset of attributes; and
   receiving, by the server computing device, a REST-based request that specifies the first canonical URL and requests a value of a second attribute and does not request the value of a first attribute when the client computing device determines that the value of the first attribute is already contained in the first cache record that is associated with the first canonical URL, and that the value of the second attribute is not contained in the first cache record that is associated with the first canonical URL.

2. The computer-implemented method of claim 1, further comprising:

storing, at the server computing device, in association with the second data that pertains to the second entity that is separate from the first entity, the second canonical URL that is not associated with any entity other than the second entity;

receiving, at the server computing device, from the client computing device, a third REST-based request that asks for at least a part of the second data; and in response to the third REST-based request, sending, to the client computing device, a response that contains both the second canonical URL and the part of the second data for which the second REST-based request asks.

3. The computer-implemented method of claim 2, further comprising:

generating the first canonical URL based on values from the first data that are assigned to a specified subset of attributes; and generating the second canonical URL based on values from the second data that are assigned to the specified subset of attributes.

4. A non-transitory computer-readable storage memory storing a plurality of instructions which, when executed by one or more processors, cause the one or more processors to perform operations comprising:

sending, by a client computing device to a server computing device, a first Representational State Transfer (REST)-based request querying for a first subset of attributes associated with a first entity;

receiving, by the client computing device from the server computing device, a first REST-based response that contains at least a first association between a first canonical Uniform Resource Locator (URL) and values of a first subset of attributes of first data that pertains to the first entity that is an entity object, wherein the first canonical URL is the same for data of the first entity stored at the server computing device and the client computing device, wherein the first canonical URL is configured as a row key that uniquely identifies a row of data stored as a first cache record in a cache of the client computing device and wherein the row of data corresponds to the first entity, wherein both the server computing device and the client computing device are configured to manage data for the first entity using the first canonical URL;

determining, by the client computing device, whether the first canonical URL received in the first REST-based response exists in the cache of the client computing device;

in response to determining that the first canonical URL received in the first REST-based response exists in the cache of the client computing device updating, by the client computing device, the row of data stored in the first cache record that is associated with the first canonical URL, the values of the first subset of attributes; and sending, by the client computing device to the server computing device the updated data corresponding to the first canonical URL, wherein the server computing device updates data corresponding to the first canonical URL that is stored in a data repository associated with the server computing device based on the updated data received from the client computing device, receiving, at the client computing device, from the server computing device, a second REST-based response that contains at least (a) a second association between a second canonical URL and values of a second subset of attributes of second data that pertains to a second entity that differs from the first entity and (b) a third association between the first canonical URL and values of a third subset of attributes of the first data that pertains to the first entity, said third subset differing from said first subset;

in response to receiving the second REST-based response, storing, in the cache at the client computing device, in a second cache record that is associated with the second canonical URL and not any other canonical URL, the values of the second subset of attributes; and in response to receiving the second REST-based response, storing, in the cache at the client computing device, in the first cache record that is associated with the first canonical URL and not any other canonical URL, the values of the third subset of attributes;

determining, at the client computing device, that a value of a first attribute of the first entity is already contained in the first cache record that is associated with the first canonical URL;

determining, at the client computing device, that a value of a second attribute of the first entity is not contained in the first cache record that is associated with the first canonical URL; and in response to determining that the value of the first attribute is already contained in the first cache record that is associated with the first canonical URL, and that the value of the second attribute is not contained in the first cache record that is associated with the first canonical URL, sending, to the server computing device, a REST-based request that specifies the first canonical URL and requests the value of the second attribute and does not request the value of the first attribute.

5. The non-transitory computer-readable storage memory of claim 4, said operations further comprising:

receiving, at the client computing device, from the server computing device, the second REST-based response that contains at least the second association between the first canonical URL and values of the second subset of attributes of the first data that pertains to the first entity, said second subset differing from said first subset; and in response to receiving the second REST-based response, storing, in the cache at the client computing device, in the first cache record that is associated with the first canonical URL, the values of the second subset of attributes.

6. A system comprising:

a memory; and a processor coupled to the memory;

wherein the processor is configured to:

send, by a client computing device to a server computing device, a first Representational State Transfer (REST)-based request querying for a first subset of attributes associated with a first entity;

receive, from the server computing device, a first REST-based response that contains at least a first association between a first canonical Uniform Resource Locator (URL) and values of a first subset of attributes of first data that pertains to the first entity that is an entity object, wherein the first canonical URL is the same for data of the first entity stored at the server computing device and the client computing device, wherein the first canonical URL is configured as a row key that uniquely identifies a row of data stored as a first cache record in a cache and wherein the row of data corresponds to the first entity, wherein both the server computing device and the client computing device are configured to manage data for the first entity using the first canonical URL;

determine, by the client computing device, whether the first canonical URL received in the first REST-based response exists in the cache of the client computing device;

in response to determining that the first canonical URL received in the first REST-based response exists in the cache of the client computing device, update, by the client computing device, the row of data stored in the first cache record that is associated with the first canonical URL, the values of the first subset of attributes, and wherein the first cache record is stored in the cache of the client computing device; and send, by the client computing device to the server computing device the updated data corresponding to the first canonical URL, wherein the server computing device updates data corresponding to the first canonical URL that is stored in a data repository associated with the server computing device based on the updated data received from the client computing device;

receive, from the server computing device, a second REST-based response that contains at least (a) a second association between a second canonical URL and values of a second subset of attributes of second data that pertains to a second entity that differs from the first entity and (b) a third association between the first canonical URL and values of a third subset of attributes of the first data that pertains to the first entity, said third subset differing from said first subset;

in response to receiving the second REST-based response, store, in the cache, in a second cache record that is associated with the second canonical URL and not any other canonical URL, the values of the second subset of attributes; and in response to receiving the second REST-based response, store, in the cache, in the first cache record that is associated with the first canonical URL and not any other canonical URL, the values of the third subset of attributes;

determine that a value of a first attribute of the first entity is already contained in the first cache record that is associated with the first canonical URL;

determine that a value of a second attribute of the first entity is not contained in the first cache record that is associated with the first canonical URL; and in response to determining that the value of the first attribute is already contained in the first cache record that is associated with the first canonical URL, but that the value of the second attribute is not contained in the first cache record that is associated with the first canonical URL, send, to the server computing device, a REST-based request that specifies the first canonical URL and requests the value of the second attribute but does not request the value of the first attribute.

7. The system of claim 6, said processor further configured to:

receive, from the server computing device, a second REST-based response that contains at least a second association between the first canonical URL and values of a second subset of attributes of the first data that pertains to the first entity, said second subset differing from said first subset; and in response to receiving the second REST-based response, store, in the cache, in the first cache record that is associated with the first canonical URL, the values of the second subset of attributes.

8. The method according to claim 1, wherein the first canonical URL is uniquely associated with the first entity so that the first canonical URL is only associated with the first entity.

9. The method according to claim 1, wherein a single record is maintained for the first canonical URL.

10. The method according to claim 1, wherein the determining whether the first canonical URL received in response to the first REST-based request exists in the cache is performed in order to prevent duplicate records.

11. The method according to claim 2, wherein the first entity and the second entity are objects in a data set and each of the first entity and the second entity has a corresponding record.

12. The method according to claim 1, wherein the updating the record stored in the cache of the client computing device comprises updating an attribute value of the record that corresponds to the first canonical URL.

13. The method according to claim 1, wherein the cache comprises a relational database.

14. The non-transitory computer-readable storage memory of claim 4, said operations further comprising:

sending, by the client computing device to the server computing device, a second Representational State Transfer (REST)-based request querying for the second subset of attributes associated with the first entity;

receiving, by the client computing device from the server computing device, the second REST-based response that contains the first canonical URL and the second subset of attributes of first data that pertains to the first entity;

determining, by the client computing device, whether the first canonical URL received in the second REST-based response exists in the cache of the client computing device; and in response to determining that the first canonical URL received in the second REST-based response exists in the cache of the client computing device updating, by the client computing device, the row of data stored in the first cache record that is associated with the first canonical URL based on the second subset of attributes.

15. The system according to claim 6, wherein the first canonical URL is uniquely associated with the first entity so that the first canonical URL is only associated with the first entity.

16. The system according to claim 6, wherein a single record is maintained for the first canonical URL.

17. The system according to claim 6, wherein the determining whether the first canonical URL received in response to the first REST-based request exists in the cache is performed in order to prevent duplicate records.

18. The computer-readable storage memory according to claim 4, wherein the first canonical URL is uniquely associated with the first entity so that the first canonical URL is only associated with the first entity.

19. The computer-readable storage memory according to claim 4, a single record is maintained for the first canonical URL.

20. The computer-readable storage memory according to claim 4, wherein the determining whether the first canonical URL received in response to the first REST-based request exists in the cache is performed in order to prevent duplicate records.

* * * * *

UNITED STATES PATENT AND TRADEMARK OFFICE
CERTIFICATE OF CORRECTION

Page 1 of 1

PATENT NO. : 10,827,035 B2
APPLICATION NO. : 14/017575
DATED : November 3, 2020
INVENTOR(S) : Rashid et al.

It is certified that error appears in the above-identified patent and that said Letters Patent is hereby corrected as shown below:

In the Claims

Column 10, Line 25, Claim 1, delete "entity-of" and insert -- entity of --, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*